(12) United States Patent
Tan

(10) Patent No.: US 11,146,930 B2
(45) Date of Patent: Oct. 12, 2021

(54) INTER-VEHICLE COMMUNICATION USING DIGITAL SYMBOLS

(71) Applicant: Weining Tan, Mississauga (CA)

(72) Inventor: Weining Tan, Mississauga (CA)

( * ) Notice: Subject to any disclaimer, the term of this patent is extended or adjusted under 35 U.S.C. 154(b) by 0 days.

(21) Appl. No.: 16/824,271

(22) Filed: Mar. 19, 2020

(65) Prior Publication Data

US 2020/0329103 A1 Oct. 15, 2020

Related U.S. Application Data

(60) Provisional application No. 62/832,380, filed on Apr. 11, 2019.

(51) Int. Cl.
*H04W 4/46* (2018.01)
*H04L 29/08* (2006.01)
*H04W 4/48* (2018.01)

(52) U.S. Cl.
CPC .............. *H04W 4/46* (2018.02); *H04L 67/12* (2013.01); *H04W 4/48* (2018.02)

(58) Field of Classification Search
CPC ............ H04W 4/46; H04W 4/48; H04L 67/12
See application file for complete search history.

(56) References Cited

U.S. PATENT DOCUMENTS

| | | | | |
|---|---|---|---|---|
| 6,243,685 | B1* | 6/2001 | Welch | B60Q 1/503 340/426.24 |
| 7,791,785 | B2* | 9/2010 | Knafou | B32B 17/10504 359/275 |
| 2013/0086164 | A1* | 4/2013 | Wheeler | C08L 97/02 709/204 |
| 2016/0373449 | A1* | 12/2016 | Haga | H04W 12/12 |
| 2019/0079659 | A1* | 3/2019 | Adenwala | H04W 4/026 |
| 2020/0082699 | A1* | 3/2020 | Jati | H04W 4/90 |
| 2020/0349836 | A1* | 11/2020 | Shibata | G08G 1/0965 |

\* cited by examiner

*Primary Examiner* — Azizul Choudhury

(57) ABSTRACT

The disclosure presents a set of novel methods and apparatus designed to add a communication ability to an external surface of a vehicle, using an animated visible light electronic message device, by selectively displaying pre-defined digital symbols. The addition of the display to a vehicle allows the vehicle to communicate with other vehicles, persons, or devices without requiring any functionality change to the other party. The new methods and apparatus also enable two vehicles that are both installed with the message devices to communicate with each other. These message devices can be installed on surfaces which include, but are not limited to, windshields of the vehicle, the top of the vehicle, the front and back bumper of the vehicle or other windows of the vehicle. The digital symbols displayed are pre-defined by the device manufacturer and not modifiable or creatable by the vehicle user. The digital symbol may be in the format of a blockchain asset that is strictly controlled and managed by the device manufacturer's eco-system. However, the vehicle user can choose which symbol to display and the way it is displayed, for example, the color, position, size, animation speed, and time and duration. The animation speed can either be fast or close to still. The display parameters can also be controlled automatically by pre-defined scripts, rules, or an artificial intelligence (A.I.). The new inter-vehicle communication networking topology ranges from point-to-point transmission and single-to-multiple broadcasting, to multiple-to-multiple and nested networks.

20 Claims, 11 Drawing Sheets

INTER-VEHICLE COMMUNICATION USING DIGITAL SYMBOLS

CROSS-REFERENCE TO RELATED APPLICATION

This application claims the benefit of U.S. Provisional Patent Application No. 62/832,380, filed Apr. 11, 2019. The entire disclosure of the above application is incorporated herein by reference.

FIELD

The present disclosure is in the field of automotive, software, digital displays, optics, media, social networks, and wireless communications.

BACKGROUND

Current vehicle communication can be divided into three categories: vehicle to user, vehicle to environment, and vehicle to vehicle. The latter is also called inter-vehicle communication.

Vehicle to user focuses on communication between the car and its occupants. Many vehicles already have vehicle to user features which include thermometers or blind spot sensors. These features can have a longer delay and higher latency. Though these technologies are capable of relaying information to the user, the user is unable to send information back or express themselves.

Vehicle to environment consists of communication between the car and its surrounding environment or network. For example, nearby street lights, traffic signals, roads, buildings, bridges, cyclists, and pedestrians can all potentially exchange information with the vehicle. The communication from vehicle to environment is already widely used. The most common scenario is vehicles relying on road signs, street lights, and traffic signals to determine their movement.

Vehicle to network refers to connecting the car to a network through a cellular network, or fixed wireless access points along the roads. This network can provide useful information such as road closures and congestion through broadcasting channels. For example, the car may alert or warn the driver of congestion due to an accident further down the road. However, problems with this include the large capital needed to set up the proper infrastructure to support the technology. It has been a long time since cars and trucks turned to a special radio channel to listen to the current weather and traffic information, or simply music for entertainment. The vehicle can also receive GPS or cellular signals for GPS devices or cell phones to work while the vehicle is moving.

Recently a lot of interest has been shown in developing vehicle to vehicle (inter-vehicle) communication technology, stemming from its potential ability to improve safety. For example, vehicles exchange their current vehicle speed, status of brakes, gas, temperature, and/or the position between the two vehicles to help prevent crashes. It also aids in reduction of congestion, traffic, and even carbon emissions. To make the most of inter-vehicle communication technologies, many technical challenges must be overcome, such as communication protocols, internet integration, wireless access methods, and hardware/software standardization. However, vehicles are only able to transmit information to other vehicles that are equipped with the proper receiving apparatus. This makes it especially difficult to start using the technology before communication devices are widely used in vehicles.

Simpler ways of inter-vehicle communication can include honking at different volumes or beats. This poses the problem of misinterpretation as well as the lack of versatility. There is a need for better inter-vehicle communication that is more expressive, more articulate, and can start communication from a single user or only a few early adopters.

A LED (Light Emitting Diode) dot-matrix display, or LED screen, is a grid of LED lights wired together, usually in a rectangle, that can be used in conjunction with a small processing unit to display simple text and images. The screen consists of rows of LEDs wired together such that you can activate each individual one independently of the others, and create patterns. Each LED represents a dot of the pattern. In this way, they can display relatively simple graphics. A LED device can be a very good choice of digital display that requires high brightness, long lifetime, and low power-consumption. A LED display device can display animated text and pictures.

A micro processing unit (MPU) is simply a regular processor, but smaller and with lower power consumption than conventional processors—for example, most ARM architecture processors (most commonly used in phones and, more recently, laptops) fit in this category, as opposed to x86 architecture CPUs more commonly used in laptop and desktop computers, which have much higher power consumption and are much larger in size—this is however a generalization, as there are x86 CPUs that could be considered MPUs, such as the Intel Atom or Pentium Gold production lines. Use of an MPU allows for much easier transportation and much lower requirements for power and cooling, which is ideal for embedded or portable use-cases. An MPU can be used to control the LED dot-matrix device to display animated content.

A blockchain is a modern and innovative way of storing a chronologically ordered list of data. The concept involves each 'block' being a contained entity with a timestamp and data bundled together, with each new entry containing a 'hash' (a way to electronically identify data—the previous data can be matched to its hash) of the previous data in the chain. This is intended to enhance security and increase trust in the list, as with this method, it is impossible to fake or otherwise change a timestamp without destroying the data as well. The most popular and first real-world implementation of this concept is for the Bitcoin cryptocurrency, where it is used to manage the secure public ledger of transactions, which prevents users from using the same coins twice and other such malpractices. The same technology can be applied to manage any chronological list properly, such as a history of messages in the present disclosure. A blockchain system can faithfully tack digital content and avoid fraud.

Self-expression is an important way for people to communicate and display their individuality, emotions, and ideas. When it comes to inter-vehicle communication, self-expression helps foster better connections and aids in exchanging information. One specific way that people realize inter-vehicle self-expression is through the medium of their vehicles. Using additions such as stickers or signs, people are able to convey information to others around their vehicles. This also opens up the possibility of chained or nested inter vehicular communication, wherein various vehicles on the road may send or relay important or useful information. Depending on the specific information transmitted, the data could be used in such a way that would be able to greatly improve the safety, efficiency, social connection, and comfort of car occupants.

Automobiles are an integral part of everyday life, and just like clothing or bags they can be customized as a show of individuality and uniqueness. Cars can be repainted, decorated, or detailed, and various bumper stickers and decals can be added. While some of these stickers simply convey an affiliation with a certain sports team or educational institution, some provide important information in the case of an emergency. For example, a "baby on board" sticker which can warn first responders that there is a child in the vehicle who may not be able to get themselves out. The problems that arise with stickers and decals involve difficult removal and application, and permanence of the installation. Vinyl and car stickers are typically single use, meaning after an application, re-adjusting its position is impossible. Too many decals can also pose a safety risk as they can obscure the driver's sight and create blind spots. The stickers and decals also cannot be easily seen in dimmed lighting conditions.

Other current ways of communication and self-expression also include paper signs, car top signs and LED lights in fixed shapes. These signs can turn the vehicle into a customized mobile message. For example, a for sale sign on the dashboard, the logo of a rideshare company, a taxi sign, an advertisement, or a driving instructor's sign. These convey different information to the surrounding cars and pedestrians and help convey the user's ideas. The current downside to these types of signs is their lack of versatility and variability. A new sign is needed for every new idea or message to be conveyed. There is a need for a new sign for each thing. The problem with a preset logo is that it can only work for that one thing and is static.

This disclosure presents new methods and apparatuses for self-expression and communication between automobile and automobile or between automobile and its environment using a smart electronic message device. Through its usage, vehicle drivers can quickly and easily convey their ideas to other drivers using a set of pre-defined animated text, pictures, and symbols without causing distractions on the road. This solves the problem of having to buy multiple static signs, as well as the visibility problem caused by having multiple decals and stickers. The smart display can be recognized by any environment subjects and any other vehicles without requiring the other party to be equipped with the same or any additional product. Therefore, the new method and apparatus achieve more expression and articulation and can start communication from a single user or only a few early adopters. Moreover, the chained and nested smart message devices can also broadcast and relay information to a larger vehicle-based communication network.

SUMMARY

The disclosure presents a set of novel methods and apparatus designed to add a communication ability to an existing surface, especially an external surface of a vehicle, using an animated light electronic message device, by selectively displaying a set of pre-defined digital symbols. The addition of the display to a vehicle allows the vehicle to communicate with other vehicles, persons, or devices without requiring any functionality change or addition to the other party. The new methods and apparatus also enable two vehicles that are both installed with said message devices to communicate with each other. These message devices can be installed on surfaces which include, but are not limited to, the windshields of the vehicle, the top of the vehicle, the front and back bumper of the vehicle, or other windows of the vehicle.

The digital symbols displayed are either human-understandable or machine-understandable visual content. Each symbol is pre-defined by the device manufacturer and not modifiable or creatable by the vehicle user. The digital symbol may be in the format of a blockchain asset that is strictly controlled and managed by the device manufacturer's eco-system. However, the vehicle user can choose which symbol to display and the way it is displayed, for example, the color, position, size, animation speed, and time and duration. The animation speed can either be fast or close to still. The display parameters can also be controlled automatically by pre-defined scripts, rules, or an artificial intelligence (A.I.).

The new inter-vehicle communication can support various networking topologies from point-to-point transmission and single-to-multiple broadcasting, to multiple-to-multiple and nested networks. The communication is useful in many scenarios, including informing other drivers of a flat tire or broken head light; warning when the vehicle is backing up; solving conflict at a 4-way stop sign; broadcasting road condition information to a vehicle at large distance or area by relaying the information vehicle-by-vehicle; asking other drivers to allow merging into a lane; or simply expressing a mood to the world. The present disclosure can also be used to turn a vehicle into a mobile advertisement for various businesses.

DETAILED DESCRIPTION

Figure 1:
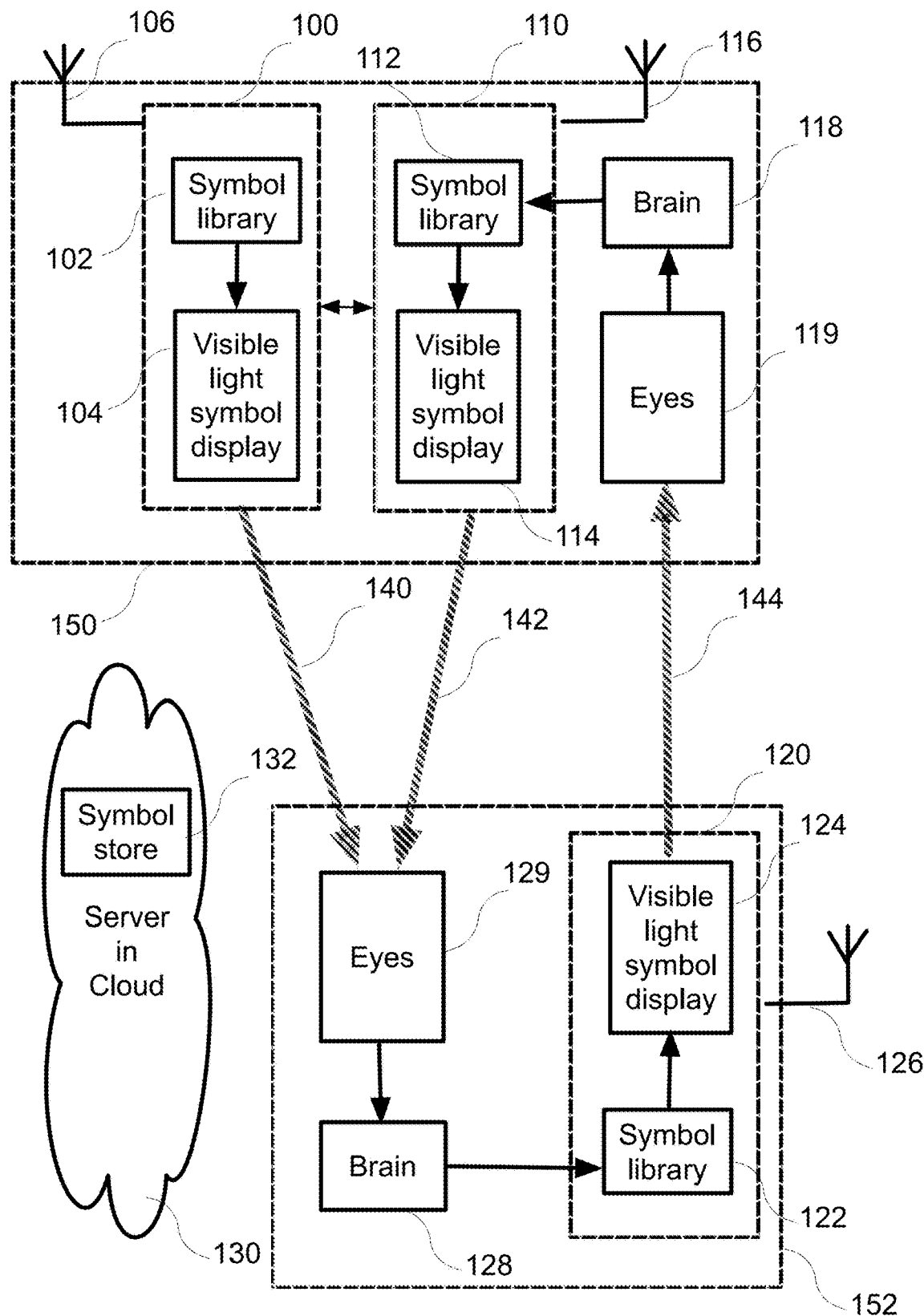
FIG. 1 illustrates a preferred embodiment of the animated multidirectional message device for the inter-vehicle communication of the present disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The disclosure presents a set of novel methods and apparatus designed to add a communication ability to an existing surface, especially an external surface of a vehicle, using an animated visible light electronic message device, by selectively displaying pre-defined digital symbols. The addition of the display to a vehicle allows the vehicle to communicate with other vehicles, persons, or devices without requiring any functionality change to the other party. The new methods and apparatus also enable two vehicles that are both installed with the message devices to communicate with each other. These message devices can be installed on surfaces which include, but are not limited to, windshields of the vehicle, the top of the vehicle, the front and back bumper of the vehicle, or other windows of the vehicle.

The digital symbols displayed are either human-understandable or machine-understandable visual contents; each symbol is pre-defined by the device manufacturer and not modifiable or creatable by the vehicle user. The digital symbol may be a static piece of text, a graphic, or a pattern; or an animated piece of text, a graphic, or a pattern. The digital symbol may be in the format of a blockchain asset that is strictly controlled and managed by the device manufacturer's eco-system. However, the vehicle user can choose which symbol to display and the way it is displayed, for example, the color, position, size, animation speed, and time and duration. The animation speed can either be fast or close to still. The display parameters can also be controlled automatically by pre-defined scripts, rules, or an artificial intelligence (A.I.).

In one special embodiment of the present disclosure, a blockchain symbol is represented by a unique string of characters. The string is encrypted with a private key and stored and tracked in a blockchain system. The blockchain stores a chronologically ordered list of data, each 'block' being a contained entity with a timestamp and data bundled together, with each new entry containing a 'hash' (a way to electronically identify data—the previous data can be matched to its hash) of the previous data in the chain. It is impossible to fake or otherwise change a timestamp without destroying the data. So the blockchain manages the secure public ledger of transactions, which prevents users from using the same symbol twice and other such malpractices. The message device will verify the authentication of a symbol every time it plans to display one and it only accepts a symbol when the user's device knows the key. In this way, it ensures a unique symbol can only be owned and used by its authentic user.

The new inter-vehicle communication can support various networking topologies from point-to-point transmission and single-to-multiple broadcasting, to multiple-to-multiple and nested networks. The communication is useful in many scenarios, including informing other drivers of a flat tire or broken head light; warning when the vehicle is backing up; solving conflict at a 4-way stop sign; broadcasting road condition information to a vehicle at a large distance or area by relaying the information vehicle-by-vehicle; asking other drivers to allow merging into a lane; or simply expressing a mood to the world. The present disclosure can also be used to turn a vehicle into a mobile advertisement for various businesses.

The methods and accessory designs presented in this disclosure will serve for exemplary purpose but are not be regarded as limited to those examples. The exemplary methods and accessory designs and all other possible variants obvious to the ordinary skilled in the art are intended to take advantage of the addition of a display that modifies a vehicle to allow it communicate with other vehicles, persons, or devices, through the selective display of predefined digital symbols.

FIG. 1 illustrates a preferred embodiment of the animated multidirectional visible light display design for the inter-vehicle communication of the present disclosure, where a human is involved in the communication. More variants and alternative designs will be illustrated in the following sections and figures. In the preferred embodiment of the design, two vehicles are depicted in (150) and (152) each with their own inhabitants represented by each inhabitants' eyes (119, 129) which transmit the scene information they perceive to their brains (118, 128). Both vehicles are equipped with the message devices (100, 110, 120) discussed in the present disclosure. The first message device (110) is a main device of the first vehicle (150). It includes an animated visible light display (114), a local symbol library (112), and an antenna (116). The second message device (100) is a secondary device of the first vehicle (150). It includes an animated visible light display (104), a local symbol library (102), and an antenna (106). The second vehicle (152) only installs a first main message device (120). It includes an animated visible light display (124), a local symbol library (122), and an antenna (126).

In most embodiments of the present disclosure, the first message device (110, 120), also called the main display unit, is normally installed internally at the front and around the windshield area of the vehicle. The second message device (100), also called the secondary display unit, is installed internally at the back or side window area of the vehicle. In some alternative embodiments of the present disclosure, the main display unit may be installed externally at the top of the vehicle. The secondary display unit may be installed externally at the back bumper or front bumper of the vehicle. In yet another embodiment of the present disclosure, the main display unit may be installed externally at the front bumper of the vehicle. It is also obvious to the ordinary skilled in the art that any of the display units can be installed internally or externally at the any location of said vehicle.

In one embodiment of the present disclosure, the first message device (110) can be connected with the second message device (100) using a wired connection or a wireless connection. If a wired connection is used, the main unit (110) draws power from the cigarette lighter receptacle of the automobile. The secondary unit (100) draws power from the main unit (110). If a wireless connection is used, the main unit (110) still draws power from the cigarette lighter receptacle of the automobile but the secondary unit (100) may draw power from the back cigarette lighter receptacle if the automobile provides one, or from its own battery inside the secondary unit (100) body. In an alternative embodiment of the present disclosure, all message devices include a battery inside them and the battery provides the power to the message device. The batteries may be all rechargeable batteries or single use batteries that require regular replacement.

The visible light display units (104, 114, 124) may be LED dot matrix display modules or LED projectors. It is obvious to the ordinarily skilled in the art that many other similar display technologies and devices can be used here as the visible light display unit of the present disclosure. The local symbol library units (102, 112, 122) may be random access memory chips or flash storage devices, which store the content information of the animated symbols to be displayed by the visible light display units (104, 114, 124). The message devices (100, 110, 120) may also contain MPUs (micro processing units) that run a software to control the logic of the visible light symbol display units (104, 114, 124), the local symbol library units (102, 112, 122), and the local antennae (106, 116, 126). The local antennae (106, 116, 126) are used for wireless connection, local Bluetooth, GPS reception, WIFI networking, and/or Cellular network connection. The MPU software logic may include the methods and processes of how the stored symbols are displayed on the visible light symbol display devices (104, 114, 124), the time and duration of the display, the animation effects of the display, and the downloading of symbols from the online symbol store (132) in the cloud (130) to local symbol libraries (102, 112, 122). There are servers in the cloud (130) to connect, manage, and monitor the display units (100, 110, 120) and vehicles (150, 152). The symbol library is connected to a server in the cloud (130) which houses a larger symbol store (132) that has a predefined set of symbols stored in it. Users can pick and download their desired symbols from the cloud server (130) into their local symbol library (102, 112, 122). The symbols stored in the symbol library can be updated at any time at the discretion of the user. There is an app software installed in the user's smartphone. The app software provides a nice, user-friendly graphic interface to allow the user to monitor and control every aspect of the hardware and software operations of the system. However, for safety consideration, the user is not allowed to operate most of the app functions when the vehicle is in motion.

The aforementioned symbol is a communication signal generated by the display unit (104, 114, 124). The signal includes, but is not limited to, text, a graphic, an image, animation, a video, or any pattern or combination. For example, "Hello", "For Sale", "Baby On Board"; or a smiley face, a waving hand, etc. The signal can also be a visual signal or other formats of the signal. For example, the signal generated is an invisible infrared pattern, a sound, or a radio frequency transmission. The signal can also be in a human-understandable format or in a machine-understandable format. For example, a phrase "I love you" can be sent in an encrypted format. It will be only recognized by a sensor or receiver that knows how to decipher the format; all other receivers only get a meaningless noise.

After installation to the vehicles, the visible light LED display (104, 114, 124) may face towards the intended recipients of the symbols, which are normally a person or device outside of the vehicle. There is also a button panel and small display panel facing towards the internal user. The button and small display panels are used by the vehicle inhabitant to control the message devices (100, 110, 120) without touching the smartphone to use app software while driving. The small display panel shows only the necessary information and the buttons are designed to minimize the distraction caused during driving. The button panel can contain physical buttons or software buttons from a touch screen surface.

The first vehicle's (150) inhabitant (118, 119) begins by choosing a symbol from the symbol store (132) in the cloud (130). This symbol is downloaded using the smartphone app into the local symbol library (112,102), which is shared between the two message devices (110,100). The user can then select and display the symbol on the visible light display (104,114) of their display devices (104,114). This is done using buttons on the panel of the message device, which are set to display different symbols. The user can set the first button to display a "smiley" symbol for example, which must have been downloaded to the local symbol library. Then, the user can set the second button to show a different animated symbol and so on. In one embodiment of the present disclosure, a visible light display is a color LED display panel. The first vehicle (150) is equipped with two message devices (110, 100), allowing the possibility of displaying one symbol on the first light display (114) and another symbol on the second (104). The two light displays (114, 104) are also capable of showing the same symbol.

The visual signals (140, 142) generated by the first main message device (110) and the second message device (100) are sent from the first vehicle (150) to the second vehicle (152). The signals are received by the inhabitant of the second vehicle (152) through his/her eyes (129) and understood by his/her brain (128). This person can then react to the symbol either through his/her driving (if a driving related signal was sent, such as 'accident ahead'), or through his/her own message device (120), which has access to the local symbol storage (122) with a display device (124). The person can then select a symbol from the local store (122) or download one from the server symbol store (132) in the cloud (130). Once chosen, the symbol is displayed on the visible light display (124) of the message device (120), which is capable of transmitting information back to the first driver in the first vehicle (150).

The inhabitant of the first vehicle (150) can then perceive the visual signal (144) from the visible light display (124) in the second vehicle (152) through his/her eyes (119) and understood by his/her brain (118). After, the user can manually select another symbol to display on their light display by pressing a button on the panel of the message device which has been preprogrammed with certain symbols, essentially sending another symbol back. The communication process can then cycle back and forth between the two vehicles.

In a preferred embodiment of the present disclosure, the first message device (110) is installed at the front of the first vehicle (150) and facing the front; the second message device (100) is installed at the back of the first vehicle (150) and facing the back. The only message device (120) is installed at the front of the second vehicle and facing the front. If the first vehicle is driving in front of the second vehicle, the inhabitant of the first vehicle (150) can see the symbol visual from the second vehicle (152), but the inhabitant of the second vehicle (152) can only receive symbol visuals from the back message device (100) of the first vehicle (150); he/she cannot see the symbol visual from the front-message device (110) of the first vehicle (150), though the back message device (100) may relay the same symbol animation from the front message device (110) and in doing so let the inhabitant of the second vehicle (152) see what was displayed on the front message device (110).

Figure 2:
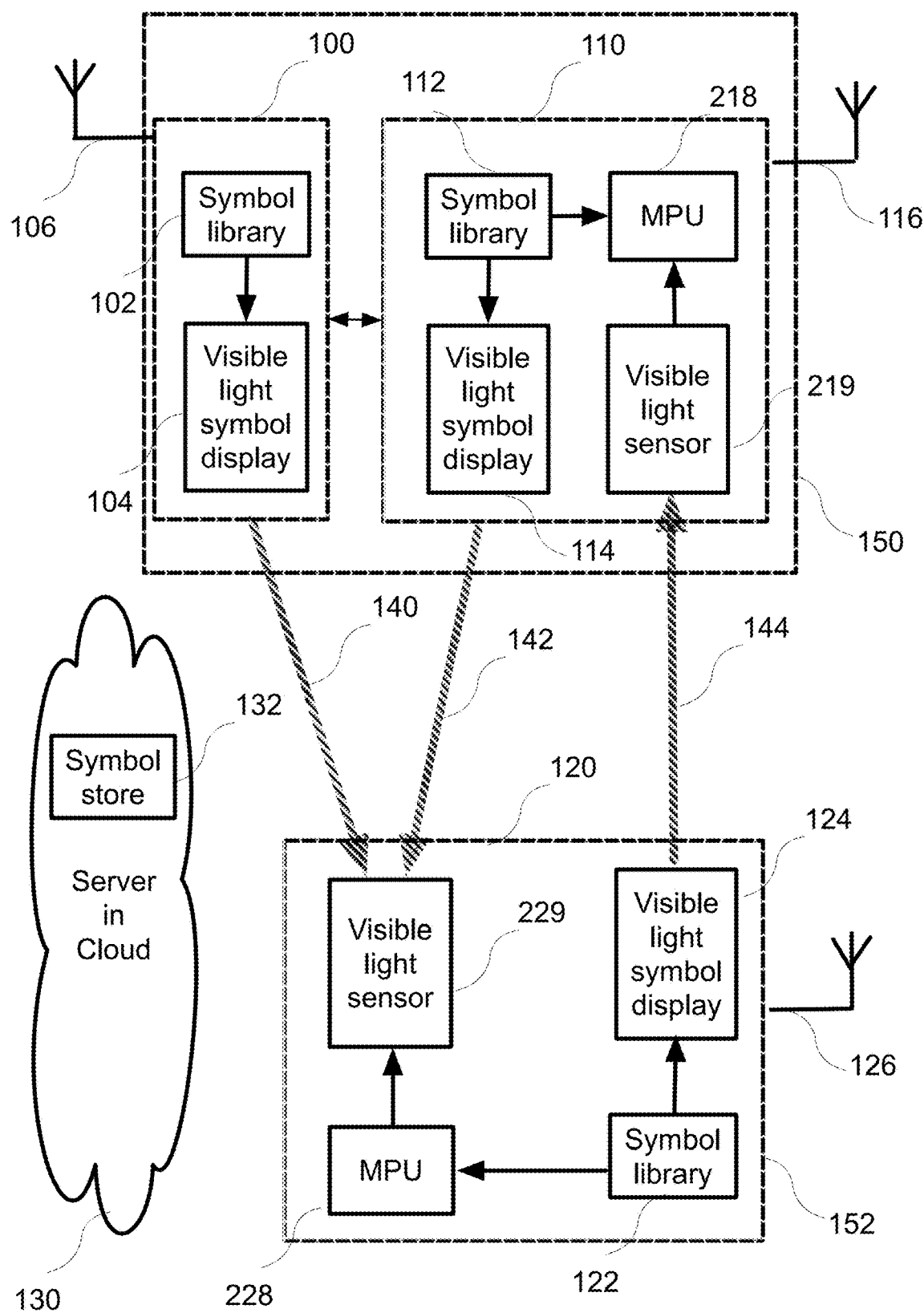
FIG. 2 illustrates an alternative embodiment of the animated multidirectional message device design for the inter-vehicle communication between two vehicles.

FIG. 2 illustrates an alternative embodiment of the present disclosure where communication is carried out without direct human intervention. A first vehicle (150) the same as the one in FIG. 1 installs a first message device (110) and a second message device (100). The second vehicle (152) the same as in FIG. 1 installs an only message device (120). Everything is exactly the same except that now the first message device (110) is equipped with a visible light sensor (219) that is controlled by an MPU (218). MPU stands for micro processing unit. Similarly, the message device (120) is equipped with a visible light sensor (229) that is controlled by an MPU (228). The new visible light sensors (219, 229) replace the previous human eyes (119, 129). The MPUs (218, 228) replace the previous human brain (118, 128).

The new visible light sensor (219, 229) is a device that can detect and decode the signal sent out by the visible light symbol display device (104, 114, 124). In most of the embodiments of the present disclosure, the visible light symbol display device (104, 114, 124) emits a light signal within a frequency band that is visible to the human eye. Though the display device is called a visible light symbol display device, in the alternative embodiments of the present disclosure, the signal could also be generated within a frequency band that is beyond visible light. For example, an infrared or ultraviolet light signal, a sound wave, or a modulated radio frequency signal. If the signal modulation is used, then the light symbol display devices (104, 114, 124) will act as a message modulator device to attach the message signal onto the carrier signal; the light sensor devices (219, 229) will act as a message demodulator device to decode the message signal from the carrier signal.

One message device (110) inside the vehicle (150) is connected to an MPU (218), which is provided data by a visible light sensor (219). This sensor can receive data (144) from visual light displays (120) from other information transfer devices (102) (for example, the one mounted on another other vehicle or one in a roadside kiosk) and decode it to find what symbol was sent. This occurs in much the same way as when the inhabitant of the vehicle views a symbol, but automated by a machine. The MPU (218, 228) is similar to those used in current embedded solutions, such as the Raspberry Pi. It can communicate with the local symbol library, and if needed, the larger symbol store in the cloud, to display a symbol on the visible light symbol display (120, 114, 104) in response to the symbol data that it receives.

The user can program the message device (100, 110, 120) to respond to a certain symbol that it sees on another visible light display (120), in differing ways. The user can give a preset response in all circumstances, for example a "smiley face" in response to all symbols that the visible light sensor (219) picks up. The MPU (218) can also be programmed to display a symbol in response to specific symbols that it detects, such as a "thumbs up" in response to a "Yield" or "Traffic Ahead" symbol. There is also the option to not display a response as well. Such controls or responses can be generated from the pre-programmed rules or artificial intelligence created by a trained A.I. module. The A.I. module may contain a trained deep-learning neural network or other types of networks.

In all cases the user still has the option to manually respond to the symbol that the sensor has picked up. The symbol will be shown on the user's display panel after the MPU (218) parses the visual data (144) it detects. If the user wants to manually display a symbol, they can press a button on their display and the symbol they set to that button using the mobile app will be displayed on the visual light display (120). The manual control or response always overrides the default machine control or response.

The user inside the vehicle (150) first programs the MPU (218) to respond to different symbols, for example a "thank you" when the visible light sensor (219) detects the visual signal (144) from a visible light display (120) showing a "Traffic Ahead", "Construction Ahead", or "Accident Ahead" symbol. Due to the fact that the vehicle (150) shown in FIG. 2 has two message devices (100,110) installed, the user is able to select different symbols to be displayed on each respective device's visible light display (104,114). The user also has the option to pair the two devices, making the visible light displays (104,114) show the same symbol.

The visible light sensor (229) of the message device (102), installed on an off-road kiosk for example, can then receive the visual signals (140,142) and parse it to find out what image was sent using the MPU which has access to the local symbol library (122) in the device (152). This device (152), depending on how it was programmed by another user, can then display a specific symbol on its visible light display in response to the signal it receives, relay the symbol by displaying the same one it received, or do nothing. If the device is programmed to not respond to the visual signal, its light display can continue to show the same symbol it was showing before it received the visual signal, or if there was no symbol being shown, continue in that state and not display a symbol.

Figure 3:
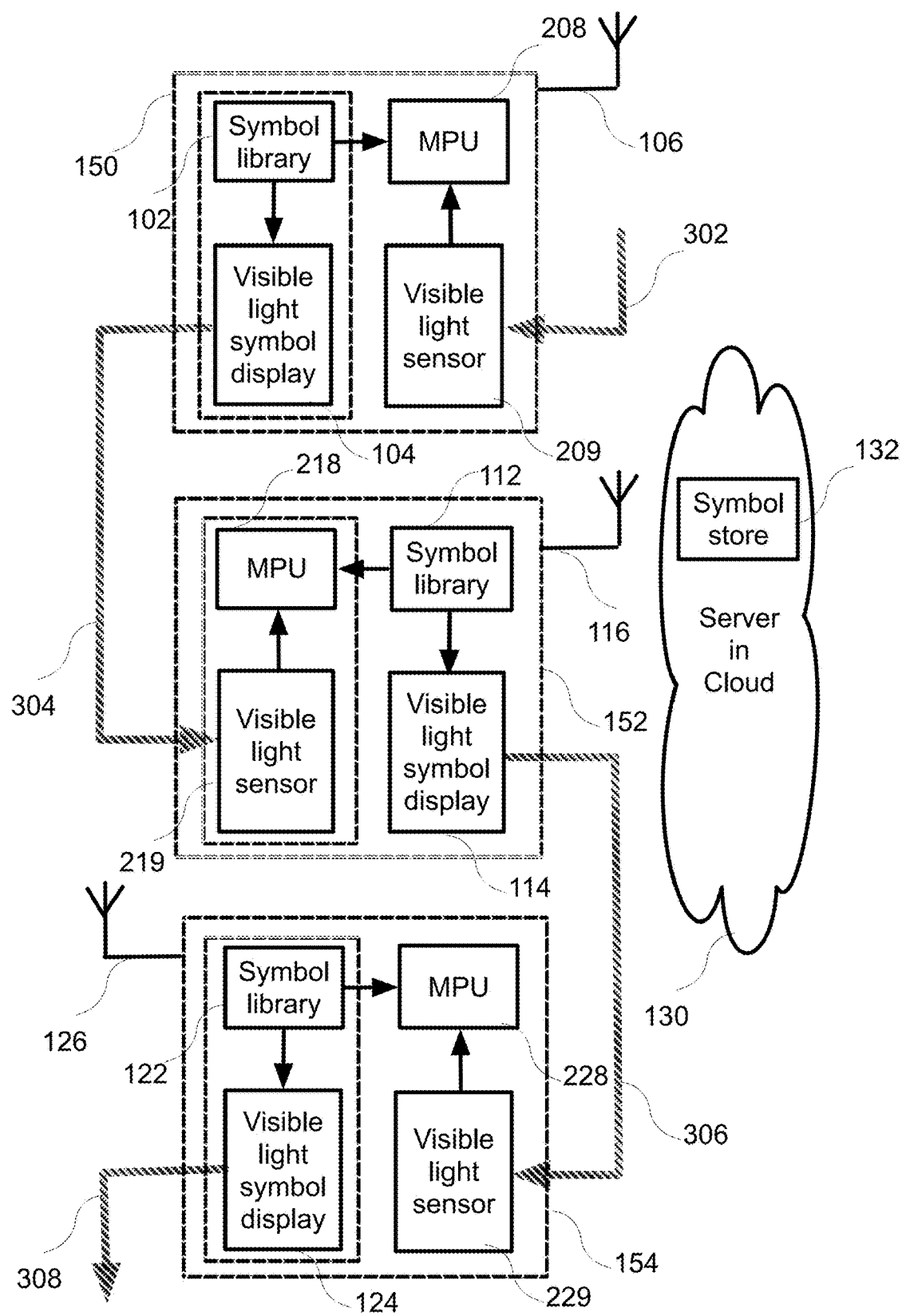
FIG. 3 illustrates an exemplary embodiment of a one-way signal chain between multiple message devices.

FIG. 3 is an exemplary embodiment of a one-way signal chain using multiple animated message devices that were described in FIG. 2. This figure shows three vehicles (150, 152, 154) that are daisy-chained in sequence. Each vehicle is equipped with an animated message device. The first vehicle (150) has installed a visible light sensor (209) at the front window that is controlled by an MPU (208). It has also installed a visible light symbol display device (104) at the rear window that is connected with a local symbol library (102). The whole rear message device is also linked to the MPU (208). Similarly, the second vehicle (152) has installed a visible light sensor (219) at the front window that is controlled by an MPU (218). It has also installed a visible light symbol display device (114) at the rear window that is connected with a local symbol library (112). The whole rear message device is also linked to the MPU (218). The third vehicle (154) has installed a visible light sensor (229) at the front window that is controlled by an MPU (228). It has also installed a visible light symbol display device (124) at the rear window that is connected with a local symbol library (122). The whole rear message device is also linked to the MPU (228).

In this way, the message devices can be linked together to form a one-way data transmission chain. The input symbol signal was passed through from the first devices (150) down to the last device (154). While the figure shows only three such devices, many more can be connected in the same way. These devices could, for example, be installed onto vehicles, bicycles, or stationary kiosks. This data transfer occurs from the visible light displays (124, 114, 104) to the visible light sensors (229, 120, 209) embedded in each device. These devices, as shown in FIG. 2, can also include an MPU (228, 218, 208) which controls the device and acts as its 'brain', as well as local storage for symbols (122, 112, 102). These devices, if they do not include an MPU or light sensor, function like the devices shown in FIG. 1, with the user perceiving the visual signal and manually setting the symbol on the visible display. Each device also has an antenna (116, 126, 106) and is capable of connecting to a server in the cloud (130), where it has access to the larger symbol store (132).

In the case of each device being installed onto a vehicle, the first visible light sensor (209) in the first vehicle (150) detects an input symbol signal (302). The input symbol information is then processed by the MPU (208). The MPU (208) sends and controls the visible light symbol display device (104) to generate and display the same symbol as the input symbol or a responding symbol from the local symbol library (102). The displayed symbol signal (304) of the first vehicle (150) is detected by the visible light sensor (219) in the second vehicle (152). The symbol information (304) is then processed by the MPU (218). The MPU (218) sends and controls the visible light symbol display device (114) to generate and display the same symbol as the input symbol or a responding symbol from the local symbol library (112). The displayed symbol signal (306) of the second vehicle (152) is then detected by the visible light sensor (229) in the third vehicle (154). The symbol information (306) is then processed by the MPU (228). The MPU (228) sends and controls the visible light symbol display device (124) to generate and display the same symbol as the input symbol or a responding symbol from the local symbol library (122). The output symbol signal of the third vehicle (154) is (308). The same transmission can be continued in a similar manner to the next vehicle, so on and so forth.

The message devices transmit the desired symbol, which can be picked up by each successive vehicle in the 'chain', and display it on their devices if desired. In this way, sending information to vehicles further down a line of cars is possible. This can be used, for example, to send information of a blockage (i.e. a traffic collision) to inform other drivers of the issue and allow them to respond to the situation accordingly. FIG. 3 also displays the device's connection (116, 126, 106) to the cloud server (130), where additional symbols (132) are stored for potential use.

In any of these cases, the vehicle may not have a visible light sensor, and so the user simply looks at the visible light display of the vehicle in front of them, and proceeds to manually press a button on the panel of the information transfer device that they have preset to a specific symbol. This displays the symbol onto that vehicle's visible light display, and the information chain continues from there.

Figure 4:
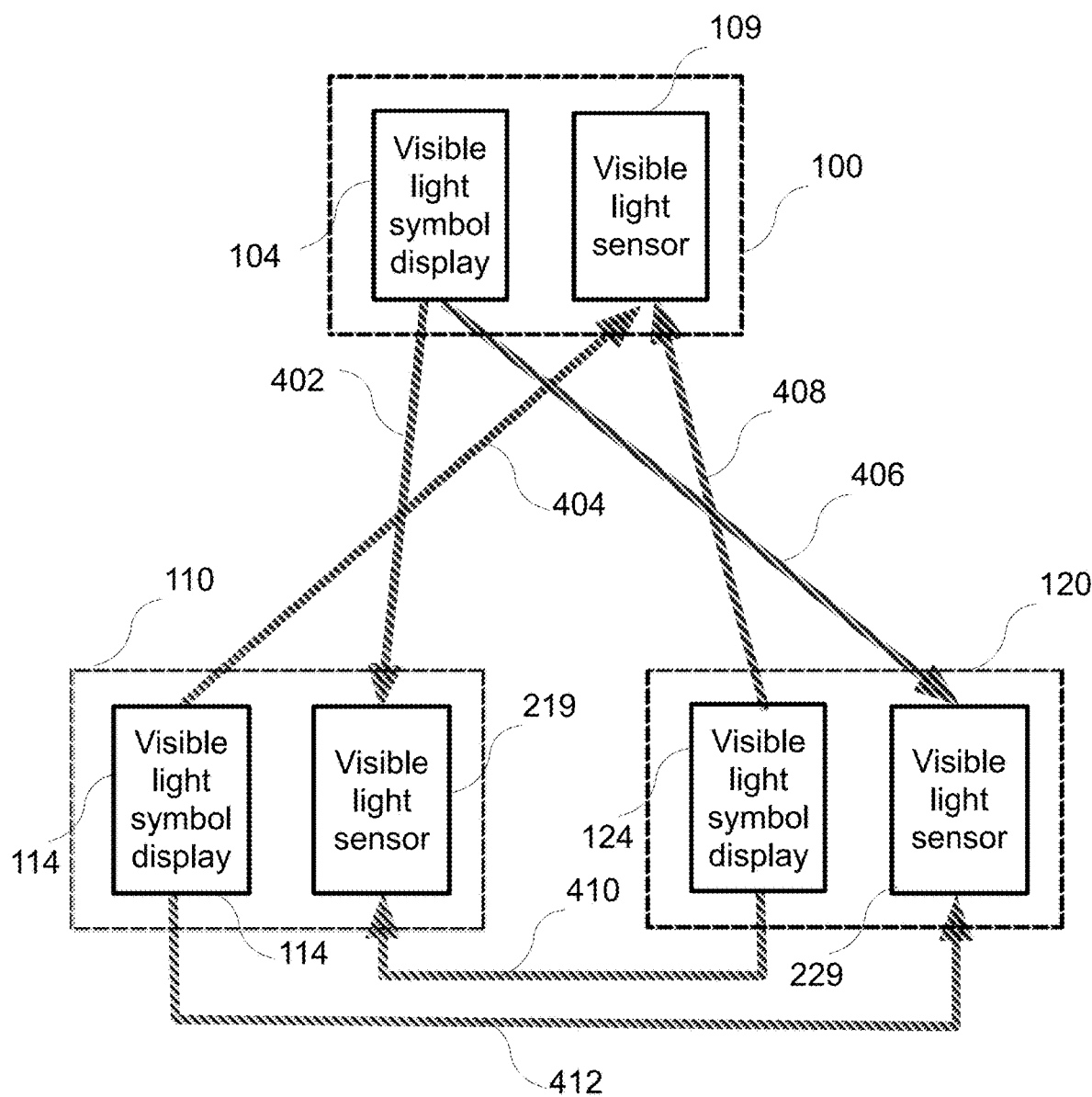
FIG. 4 illustrates an exemplary embodiment of the permutations of signal chains between multiple message devices.

FIG. 4 illustrates an exemplary embodiment of the full permutations of symbol communication chains between multiple message devices. In this case, each device (100, 110, 120) communicates with both other devices at once. This is accomplished by transmitting a symbol from the built in visible light display (104, 114, 124) to both other visible light sensors at once (109, 219, 229). The data transfer between them is conveyed via arrows (402, 404, 408, 406, 410, 412). This allows for transfer of information from one device to many, also known as broadcasting, which is not only useful in a situation with three cars, but also with a stationary object (such as a traffic light or sign) which could be transmitted to many waiting cars at an intersection at once. Again, each device may or may not have a visible light sensor (109, 219, 229) and can instead simply have the user look and see the visual signals (402, 404, 408, 406, 410, 412). In that case, those devices will not be connected to an MPU, and will instead look as the devices shown in FIG. 1 do. In this scenario, each person will look with their eyes, and then process the visual signal normally and react accordingly.

For example, three drivers arrive at an intersection with 3-way stop signs, they do not know who should pass first because they arrive at the exact same time—each can transmit their intentions to the other drivers via the light message device described in the present disclosure—either that they wish to stop or go first—and then the traffic can continue flowing without incident. The three drivers may not all have their vehicles installed with the message device described in the present disclosure. However, as long as one of the vehicles has the device installed, inter-vehicle communication will be facilitated because the display symbol can be perceived by the driver in any vehicle, including the ones without display devices and sensors.

In the case of broadcasting, the devices are exactly as depicted in FIG. 4, where one device (100) displays a symbol on its light display (104), which is transmitted to the other two devices (110,120). The visual signal from the first device (402,406) is received by the visible light sensors (219,229) of the other two devices (110,120). This process goes on simultaneously with the other devices. That is, device 110 transmits a visual signal (404,412) to the other two devices (100,120) from its visible light display (114) while simultaneously receiving a visual signal (402,410) from the other two devices (100,120). Device 120 transmits a visual signal (408,410) to the other two devices (100,110) from its visible light display (124) while simultaneously receiving a visual signal (406,412) from the other two devices (100,110).

Figure 5:
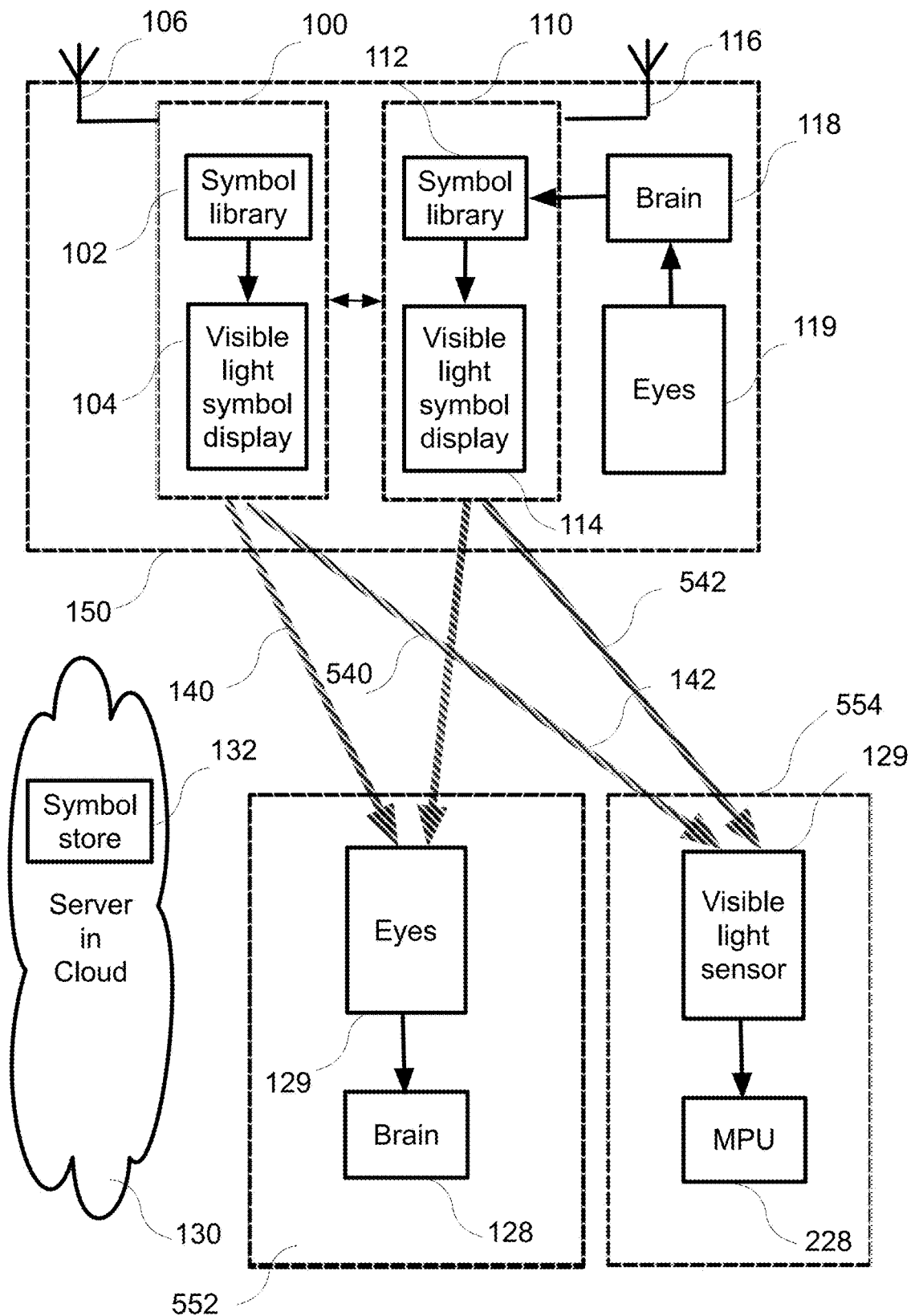
FIG. 5 illustrates an exemplary embodiment of the communication of the present disclosure in a unidirectional way.

FIG. 5 illustrates an exemplary embodiment of the present disclosure in a unidirectional way, where a vehicle (150) is equipped with the two visible light message devices (100, 110), transmitting a signal to both a human and a receive-only device in the environment. This includes, but is not limited to, a pedestrian, a building on the roadside, a traffic light, rail road facility, or any other things obvious to the ordinarily skilled in the art. The vehicle (150) is similar to the one depicted in FIG. 1; it only has message devices that have a visible light display (104, 114) and a connected local symbol library (112, 102).

In one embodiment of the present disclosure, a pedestrian is represented by 552 and a receive-only device is represented by 554. The receive-only device (554) has only a visible light sensor (129) and an MPU (228). The user would set the symbol they want to be displayed on their visible light displays (104,114) before operating the vehicle (150). Then, for example, when they reach an intersection, a pedestrian (552) perceives the visual signals (140, 540) from the light displays (104,114) with their eyes (129) and processes the information in their brain (128). At the same time, a receive-only device which could be installed onto objects such as a traffic camera, also perceives the visual signals (142,542) from the vehicle, with its visible light sensor (129). This information gets processed in the device's MPU (228). In this embodiment of the present disclosure, a vehicle can send out information to its environment.

Figure 6:
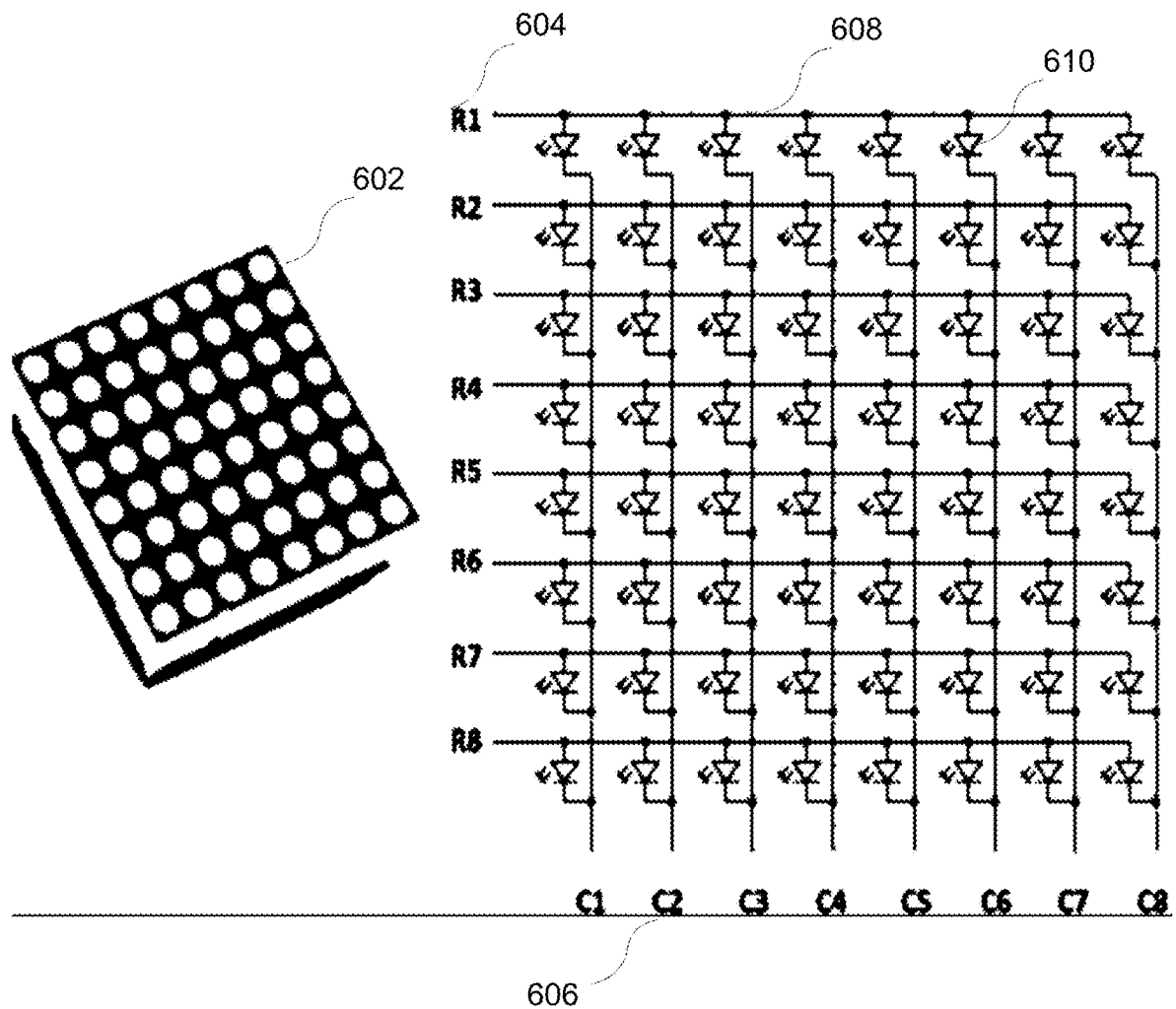
FIG. 6 illustrates an exemplary LED matrix display as a particular design embodiment of the present disclosure.

FIG. 6 illustrates an exemplary LED matrix display as a preferred design embodiment of the present disclosure. An LED matrix (602) is made up of multiple diodes (610) connected together in rows (604) and columns (606). Typically, all the anodes are connected with wires (608) by the rows and all the cathodes are connected in the columns, or vice versa. Each LED is addressed to its row and column number. Each LED can be controlled individually by controlling the electricity through each pair of columns or rows' diode. By turning on or off certain diodes, patterns and symbols can be made to appear on the matrix display.

Figure 7:
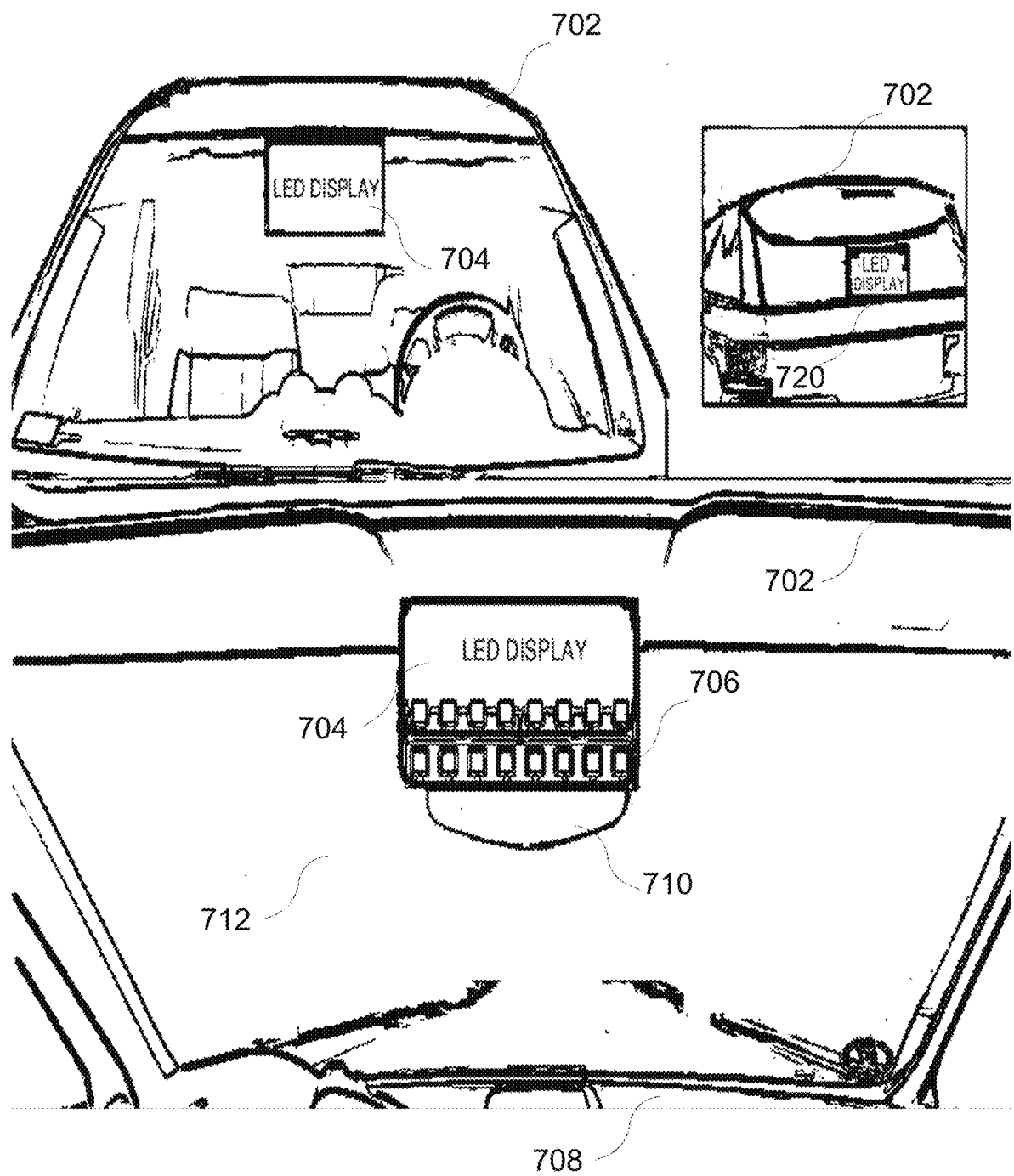
FIG. 7 illustrates an exemplary installment embodiment of the present disclosure inside a vehicle.

FIG. 7 illustrates an exemplary installment embodiment of the present disclosure inside a vehicle (702). The message device, in the form of an LED display (704) is installed internally onto the front windshield (712) of the vehicle (702). The LED display (704) faces outwards so that it faces away from the user who sits inside the vehicle (702). Another message device (720) is installed internally on the back windshield of the car (702). Both of these displays are controlled by the control buttons (706) which sit in the panel that also houses the LED display (704) and faces the user. The control panel sits above the rear-view mirror (710) and in front of the front windshield (712) of the car (702). This means that the car dashboard (708) would be in front of the user and below the panel display (704). This display (704) would be used to show which symbol was being displayed on the outward facing displays (704,720), or in the case of a message device like that in FIG. 3, it would show the symbol that the sensor detects and perceives. The installation locations illustrated in FIG. 7 are only for exemplary purpose and are not to be regarded as limited to those examples. All other installation locations, positions, and methods that are obvious to the ordinary skilled in the art can also be used.

Figure 8:
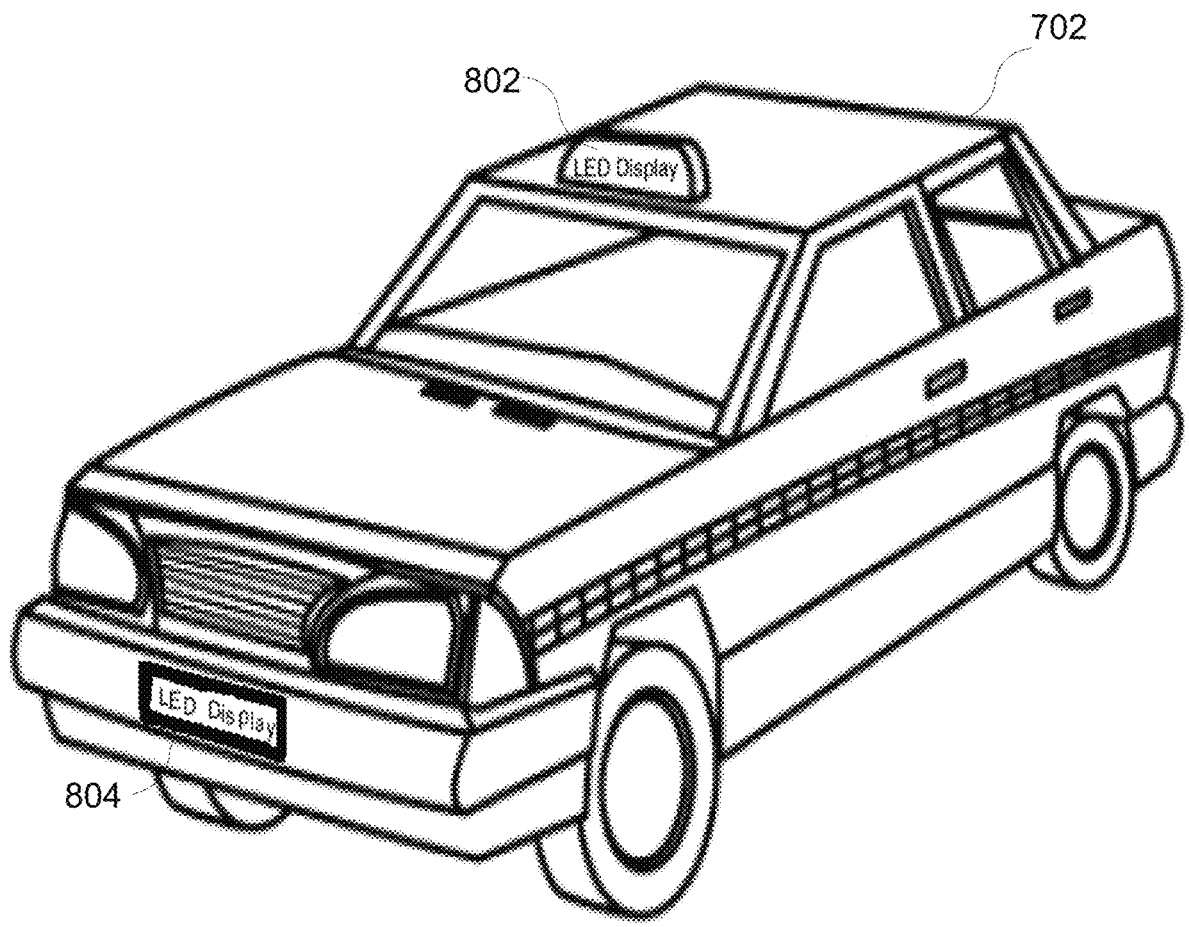
FIG. 8 illustrates an exemplary installment embodiment of the present disclosure outside a vehicle.

FIG. 8 illustrates an exemplary installment embodiment of the present disclosure outside a vehicle (702). One message device (802) is shown mounted onto the rooftop of the car (702) whereas another LED message device (804) is mounted onto the front bumper of the car. Another place that an LED display can be mounted is on the rear bumper of the vehicle (702). The LED message device can be mounted anywhere on the vehicle that is obvious to the ordinary skilled in the art to facilitate symbol display and information transmission.

Figure 9:
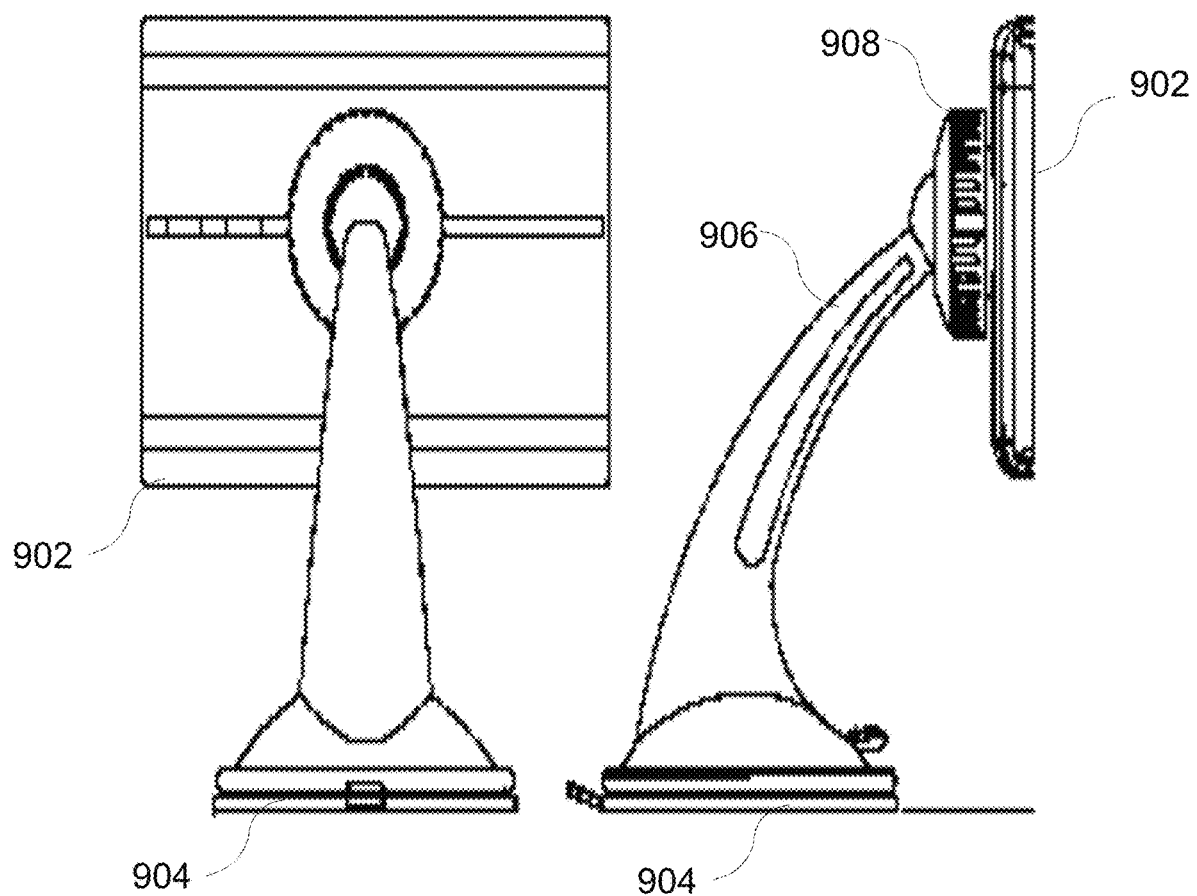
FIG. 9 illustrates an exemplary display holder as a particular design embodiment of the present disclosure.

FIG. 9 illustrates an exemplary internal message device holder as a particular design embodiment of the present disclosure. The holder (908) is attached to a handle (906) that is attached to a sucker (904). The sucker (904) can be placed onto the dashboard, front windshield, or anywhere that it is smooth and capable of sticking. The message device (902) is then mounted onto the surface of the holder (908). This holder is similar to many smartphone and GPS holders that are deployed inside vehicles; consequently, any of those existing device holders may also function to hold the present device embodiment of the disclosure.

Figure 10:
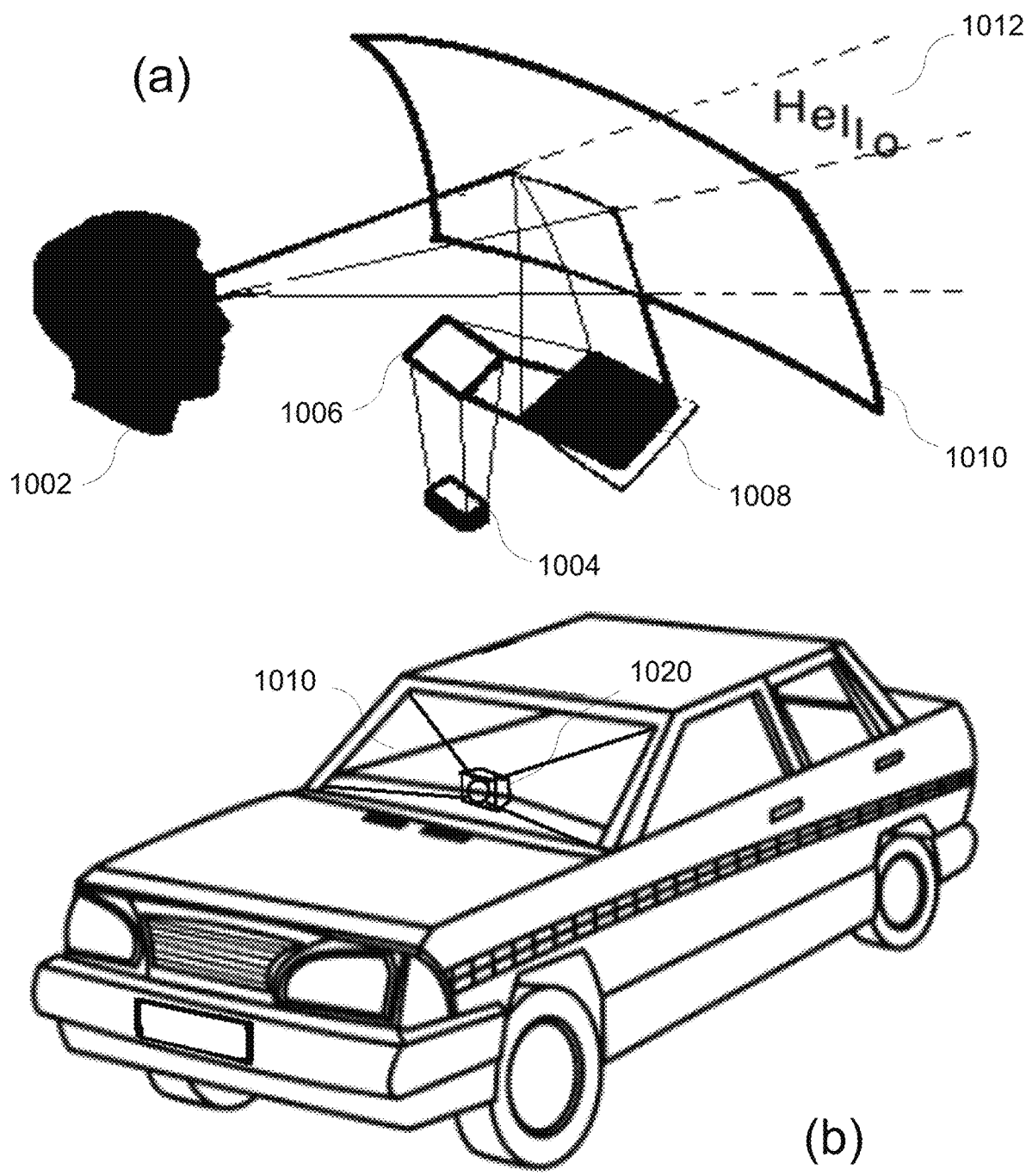
FIG. 10 illustrates an exemplary message device using a projector display on a vehicle windshield as a particular design embodiment of the present disclosure.

FIG. 10 illustrates an exemplary projector display on a vehicle windshield as a particular design embodiment of the present disclosure. Sub-figure (a) shows a holographic projector, where the symbol image from the display device (1004) is reflected off the first mirror (1006), which then reflects off of an aspheric mirror, which reflects the symbol onto the vehicle windshield (1010). Part of the light reflects into the user's vision (1002) as a holograph. The final image (1012) is perceived at the distance of the car by the user (1002). In this way, information transfer like that above is achieved. The above described holographic projector is only for exemplary purpose and is not to be regarded as limited to it. All other projectors or display technologies that are obvious to the ordinary skilled in the art to serve the same or similar purposes of the present disclosure can be also used here.

The sub-figure (b) shows the exemplary projector message device (1020) as described in the sub-figure (a) can be installed behind the front windshield (1010) of a vehicle.

Figure 11:
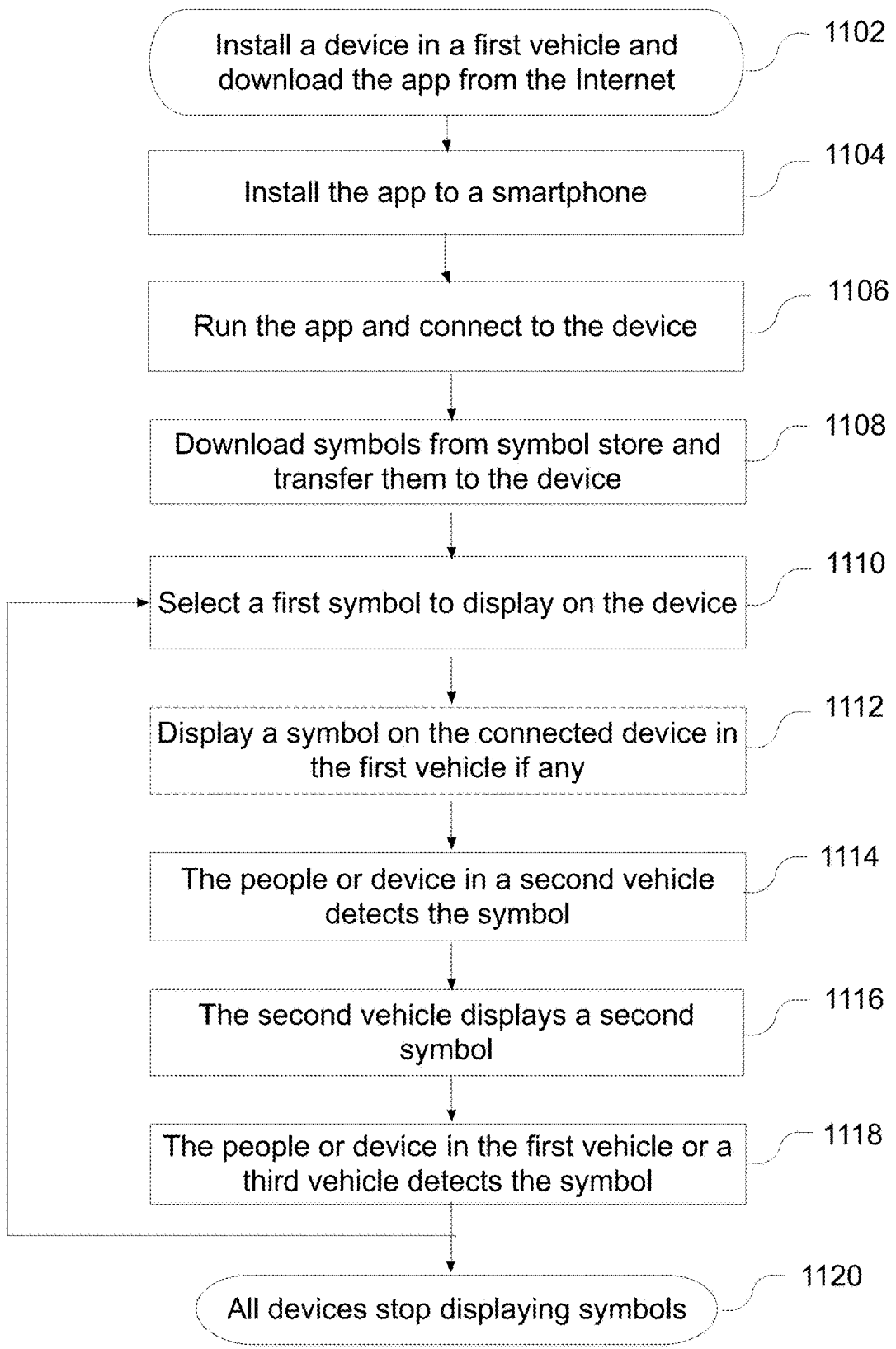
FIG. 11 illustrates an exemplary workflow of the installation and usage of the present disclosure in a vehicle.

FIG. 11 illustrates an exemplary workflow of the installation process and usage of the present disclosure in a vehicle. A user first installs the message device into his or her vehicle, which involves installing one display panel facing outside and one facing the user, and downloads the message device's application software from the Internet (1102). The app then needs to be installed onto a smartphone or any other mobile device capable of installing applications (1104). The app must then be paired to the message device installed inside the vehicle (1106). Using the app, the user can purchase and download symbols from the online symbol store and transfer them onto the local symbol storage on the display device (1108). At this stage, the user is able to configure the buttons located on the panel display to different symbols. Then, the user can press a button on the display panel to choose a symbol to show on the visible light display device (1110). If there are multiple devices installed in the vehicle, a symbol can be selected to be displayed on the other devices. It is also possible that all or some of the devices are connected together. In this case, all of the visible light displays are connected to each other and to only one control panel. This control panel, which includes controls buttons and a user display, can be used to select a symbol to be displayed on all the connected light displays (1112).

Then, the inhabitants of other vehicles or a message device that is equipped with a light sensor can detect the symbol that is being displayed from the first vehicle (1114). In response, a user in the second vehicle can press a button on their control panel to display a symbol, or if programmed, the MPU embedded in the message device can parse and recognize the visual signal it receives and display the appropriate response automatically (1116).

Now the user in the first vehicle or a user in a third vehicle can detect the symbol that the second vehicle has displayed (1118). With the user in the first vehicle, the symbol may be a reply to the first symbol. With the user in the third vehicle, the symbol may be a relay or extension of the first symbol. The first and third vehicle can loop back to (1110) continue the transfer of information by selecting another symbol to display. This cycle can continue on indefinitely and with multiple vehicles. The workflow ends when all devices stop displaying symbols (1120). This would happen at the end of the vehicle trip or if the user wanted to turn the devices off.

The invention claimed is:

1. A method for adding a bi-directional visual communication ability between a first and second vehicle, comprising: providing a first message device on the first vehicle and a second message device on the second vehicle;
   wherein the first and second message devices are within sight of each other; wherein each of the first message devices has a first visible light display component and the second message device has a second visible light display component; wherein each of the first message devices has a first visible light sensor and a first processing unit and the second message device has a second visible light sensor and a second processing unit; providing a first library of digital symbols in the first message devices and a second library of digital symbols in the second message device; wherein the symbols are stored in each message device and/or downloadable or accessible from an external data channel; wherein all the symbols are pre-defined and not allowed to be created or modified by end-users; wherein the first and second message devices are not same, compatible, connected, or related to a same platform or service; selecting a first symbol from the first library; displaying the first symbol on the first display component according to a first set of display parameters; receiving and recognizing the displayed first symbol in the second visible light sensor and second processing unit of the second message device; selecting a second symbol from the second library according to the recognized first symbol; displaying the second symbol on the second display component according to a second set of display parameters; receiving and recognizing the displayed second symbol in the first visible light sensor and first processing unit of the first message device.

2. The method of claim 1, wherein the symbol receiving uses a human eye and symbol recognizing uses a human brain.

3. The method of claim 1, wherein the first vehicle may install two or more said message devices.

4. The method of claim 3, wherein the two message devices on the same vehicle are connected with each other.

5. The method of claim 3, wherein the symbols displayed by the two message devices on the first vehicle can be received and recognized by the second message device on the second vehicle.

6. The method of claim 1, wherein the external data channel is a cellular data, Wi-Fi, other wireless connection, removable storage device, or wired connection.

7. The method of claim 1, further comprising providing a third message device on a third vehicle; wherein an input symbol is received and recognized in the first message device on the first vehicle; the same symbol is displayed on the first display component in the first message device on the first vehicle and received and recognized in the second message device on the second vehicle; the recognized symbol is then displayed on the second display component in the second message device on the second vehicle and received and recognized in the third message device on the third vehicle; the recognized symbol is then displayed on the third display component in the third message device on the third vehicle.

8. The method of claim 7, wherein the input symbol is the one displayed on the third display component in the third message device on the third vehicle.

9. The method of claim 7, wherein the symbol displayed on the first display component in the first message device on the first vehicle is also received and recognized in the third message device on the third vehicle; the symbol displayed on the second display component in the second message device on the second vehicle is also received and recognized in the first message device on the first vehicle; and the symbol displayed on the third display component in the third message device on the third vehicle is also received and recognized in the second message device on the second vehicle.

10. The method of claim 1, wherein the location of the second vehicle is stationary and the second message device on the second vehicle is for either displaying or receiving.

11. The method of claim 1, wherein the digital symbol are texts, drawings, images, animations, videos, or other contents.

12. The method of claim 1, wherein at least one of the message devices can display, receive, and recognize the digital symbol automatically without human intervention.

13. The method of claim 1, wherein the symbol selection is through a button panel and/or smartphone app software.

14. The method of claim 1, wherein the symbols are represented as blockchain-based digital tokens.

15. An apparatus for adding a bi-directional visual communication ability between a first and second vehicle, comprising: a first message device installed on or in the first vehicle and a second message device installed on or in the second vehicle; wherein the first and second message devices are within sight of each other; wherein the first message device has a first visible light display device and the second message device has a second visible light display device; wherein each of the first message devices has a first visible light sensor and a first processing unit and the second message device has a second visible light sensor and a second processing unit; a first library of digital symbols stored in the first message device and a second library of digital symbols stored in the second message device; wherein the symbols may be also downloadable or accessible from an external data channel; wherein the symbols are pre-defined texts, drawings, images, animations, videos, other contents, and/or those represented as blockchain-based digital tokens, which are not allowed to be created or modified by end-users; wherein the first and second message devices are not same, compatible, connected, or related to a same platform or service; an interface of the first message device that can be used to select a first symbol from the first library and display the first symbol on the first visible light display device according to a first set of display parameters; an interface of the second message device that can be used to control the receiving and recognizing the displayed first symbol in the second message device and select a second symbol from the second library and display the second symbol on the second visible light display device according to a second set of display parameters; wherein the second symbol is a response to the first symbol after understanding; wherein the display parameters are customizable.

16. The apparatus of claim 15, wherein the at least one of the visible light display devices is an LCD dot matrix panel, LED projector, or holographic projector;
wherein the user interface is a button, touch screen, or other man-machine interfacing device;
wherein the visible light sensor is a camera; wherein the processing unit is a micro processing unit (MPU); wherein at least one of the message devices may comprise more than one visible light display devices; wherein the display parameters may be determined by an artificial intelligence (A.I.).

17. The apparatus of claim 15, wherein the message device can be installed on the front windshield, back windshield, side windows, top, or in front of the vehicle; wherein the first vehicle may install multiple first message devices.

18. The apparatus of claim 15, wherein at least one of the message devices can display, receive, and recognize the symbol automatically without human intervention; wherein the symbol receiving may use a human eye and symbol recognizing use a human brain.

19. The apparatus of claim 15, wherein the external data channel is a cellular data, Wi-Fi, other wireless connection, removable storage device, or other wired connection; wherein an app software is used for managing the symbols and/or operating the device through the wireless connection.

20. The apparatus of claim 15, wherein the location of the second vehicle is stationary and the second device on the second vehicle is for either displaying or receiving.

* * * * *